(12) United States Patent
Mendiratta et al.

(10) Patent No.: US 10,469,538 B2
(45) Date of Patent: *Nov. 5, 2019

(54) CALL PRESERVATION FOR MULTIPLE LEGS OF A CALL WHEN A PRIMARY SESSION MANAGER FAILS

(71) Applicant: Avaya Inc., Santa Clara, CA (US)

(72) Inventors: Harsh V. Mendiratta, East Brunswick, NJ (US); Tibor Lukac, Superior, CO (US); Stephen Andrew Baker, Arvada, CO (US)

(73) Assignee: Avaya Inc., Santa Clara, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 15/087,769

(22) Filed: Mar. 31, 2016

(65) Prior Publication Data

US 2017/0289200 A1    Oct. 5, 2017

(51) Int. Cl.
| | | |
|---|---|---|
| G06F 15/16 | (2006.01) | |
| H04L 29/06 | (2006.01) | |
| H04L 29/14 | (2006.01) | |

(52) U.S. Cl.
CPC ...... *H04L 65/1006* (2013.01); *H04L 65/1069* (2013.01); *H04L 65/1083* (2013.01); *H04L 69/40* (2013.01)

(58) Field of Classification Search
CPC ............. H04L 65/1006; H04L 65/1069; H04L 65/1083; H04L 69/40
See application file for complete search history.

(56) References Cited

U.S. PATENT DOCUMENTS

| | | | |
|---|---|---|---|
| 2006/0294245 A1* | 12/2006 | Raguparan | ........ H04L 29/06027 709/227 |
| 2007/0019540 A1 | 1/2007 | Biswas et al. | |
| 2008/0013447 A1* | 1/2008 | Lauber | .................. H04L 65/105 370/225 |
| 2008/0069065 A1 | 3/2008 | Wu et al. | |
| 2009/0177785 A1 | 7/2009 | Reid et al. | |

(Continued)

OTHER PUBLICATIONS

Okumura et al. "Session Initiation Protocol (SIP) Usage of the Offer/Answer Model," IETF Trust, Aug. 2011, RFC 6337, 33 pages.

(Continued)

*Primary Examiner* — Cheikh T Ndiaye
(74) *Attorney, Agent, or Firm* — Sheridan Ross P.C.

(57) ABSTRACT

In response to a failure of a SIP dialog between a first communication endpoint and a first communication application (i.e., when a session manager fails), a first Session Initiation Protocol (SIP) INVITE with replaces header message received from the first communication endpoint. The first SIP INVITE with replaces header message comprises a Session Description Protocol (SDP) offer and a first request Universal Resource Identifier (URI) that identifies the first communication application. In response to receiving the first SIP INVITE with replaces header message, a second SIP INVITE with replaces header message is sent to a second communication application. The second SIP INVITE with replaces header message is used to reestablish all the SIP failed dialogs in order to reestablish the original communication session and reestablish the original media stream.

20 Claims, 4 Drawing Sheets

(56) References Cited

U.S. PATENT DOCUMENTS

| | | | | |
|---|---|---|---|---|
| 2009/0257433 A1* | 10/2009 | Mutikainen | ....... | H04W 36/0011 370/392 |
| 2009/0327516 A1* | 12/2009 | Amishima | .......... | H04L 65/1069 709/238 |
| 2010/0098093 A1* | 4/2010 | Ejzak | .................. | H04L 61/2546 370/401 |
| 2010/0215037 A1* | 8/2010 | Long | .................... | H04L 65/1063 370/352 |
| 2010/0238928 A1* | 9/2010 | Prouvost | .......... | H04L 29/06027 370/392 |
| 2010/0293240 A1* | 11/2010 | Lee | ..................... | H04L 12/1827 709/206 |
| 2011/0191487 A1 | 8/2011 | Ziems et al. | | |
| 2013/0021998 A1 | 1/2013 | Shatsky | | |
| 2014/0095723 A1* | 4/2014 | Ezell | ..................... | H04L 67/141 709/227 |
| 2015/0131526 A1* | 5/2015 | Noldus | ................. | H04W 76/02 370/328 |
| 2016/0150455 A1 | 5/2016 | Suryavanshi | | |
| 2016/0380967 A1 | 12/2016 | Moore et al. | | |

OTHER PUBLICATIONS

Rosenberg et al. "An Offer/Answer Model with the Session Description Protocol (SDP)," The Internet Society, Jun. 2002, RFC 3264, 26 pages.

Official Action for U.S. Appl. No. 15/087,790, dated Nov. 17, 2017 14 pages.

Official Action for U.S. Appl. No. 15/087,790, dated May 23, 2018 16 pages.

* cited by examiner

CALL PRESERVATION FOR MULTIPLE LEGS OF A CALL WHEN A PRIMARY SESSION MANAGER FAILS

BACKGROUND

A communication session that uses Session Initiation Protocol (SIP) may have multiple SIP dialogs. A SIP dialog is a communication session between two elements. For example, a communication session between a first communication endpoint and a second communication endpoint with two Back-to-Back User Agents (B2BUAs) will have three separate SIP dialogs. A first SIP dialog between the first communication endpoint and the first B2BUA, a second SIP dialog between the first B2BUA and the second B2BUA, and a third SIP dialog between the second B2BUA and the second communication endpoint. If multiple SIP dialogs fail (e.g., a session manager that controls all the SIP dialogs fails), currently there is no solution on how to fail over all the SIP dialogs. Instead, the communication session is dropped.

SUMMARY

These and other needs are addressed by the various embodiments and configurations of the present disclosure. In response to a failure of a SIP dialog between a first communication endpoint and a first communication application (i.e., when a session manager fails), a first Session Initiation Protocol (SIP) INVITE with replaces header message received from the first communication endpoint. The first SIP INVITE with replaces header message comprises a Session Description Protocol (SDP) offer and a first request Uniform Resource Identifier (URI) that identifies the first communication application. In response to receiving the first SIP INVITE with replaces header message, a second SIP INVITE with replaces header message is sent to a second communication application. The second SIP INVITE with replaces header message is used to reestablish all the SIP failed dialogs in order to reestablish the original communication session and reestablish the original media stream.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
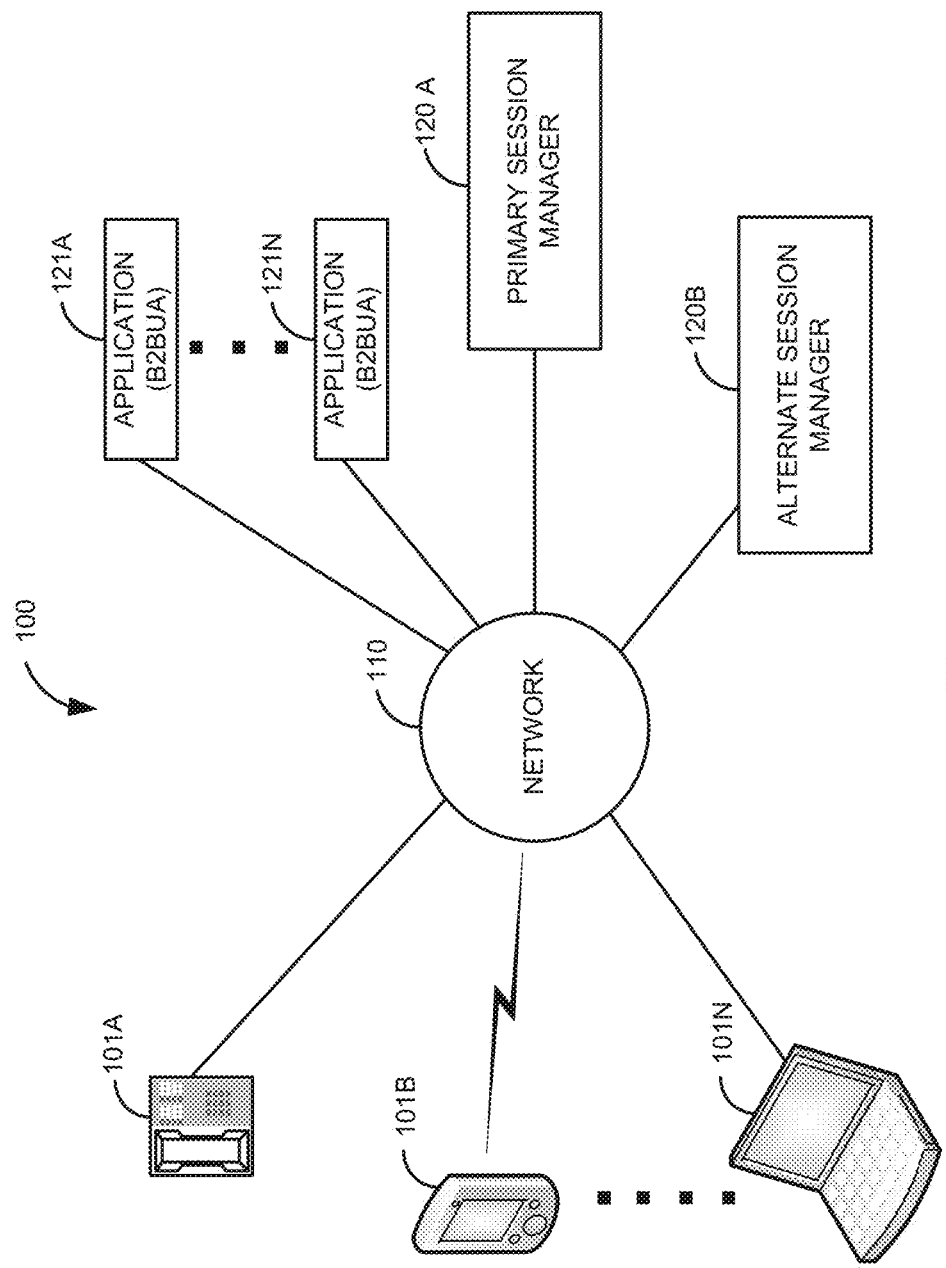
FIG. 1 is a block diagram of a first illustrative system for preserving multiple SIP dialogs in a communication session.

FIG. 1 is a block diagram of a first illustrative system 100 for preserving multiple SIP dialogs in a communication session. The first illustrative system 100 comprises communication endpoints 101A-101N, a network 110, a primary session manager 120A, an alternative session manager 120B, and applications 121A-121N.

The communication endpoints 101A-101N can be or may include any device that can communicate on the network 110, such as a Personal Computer (PC), a telephone, a video system, a cellular telephone, a Personal Digital Assistant (PDA), a tablet device, a notebook device, a smart phone, and/or the like. The communication endpoints 101A-101N use SIP to connect to the session managers 120A-120B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The primary session manager 120A can be, or may include, any hardware coupled with software that can manage SIP communication sessions between the communication endpoints 101A-101N, such as a Private Branch Exchange (PBX), a central office switch, a proxy server, a communication manager, and/or the like. The primary session manger 120A is used by the communication endpoints 101A under normal conditions.

The alternative session manager 120B is a backup session manager 120 to the primary session manager 120A. The alternative session manager 120B takes over when the primary session manager 120A fails or is unreachable by the communication endpoints 101A-101N.

The applications 121A-121N can be or may include hardware/software that can be inserted into a SIP communication session, such as, a call recording application, a call forwarding application, a call screening application, a security application, a call forking application, and/or the like. The applications 121A-121N are communication applications. The applications 121A-121N are shown as separate from the session manager 120A/120B. However, in some embodiments, the applications 121A-121N may be part of the primary session manager 120A and/or the alternate session manager 120B. The applications 121A-121N are typically SIP Back-to-Back User Agents (B2BUAs). The applications 121A-121N are typically inserted into a SIP communication session between two or more communication endpoints 101A-101N. Any number of applications 121 may be inserted into a SIP communication session. The applications 121A-121N may be inserted into a SIP signaling channel (i.e., the flow of SIP messages to establish a communication session) and/or a media channel (e.g., a voice or video of a communication session). For example, a call recording application 121 may be inserted into the signaling channel and the media stream of a voice communication session between the communication endpoints 101A and 101B.

Under normal conditions, the primary session manager 120A controls which of the applications 121A-121N are inserted into the communication channel/media stream. The applications 121A-121N may be inserted based on user preferences, administered preferences, default preferences, and/or the like.

Figure 2:
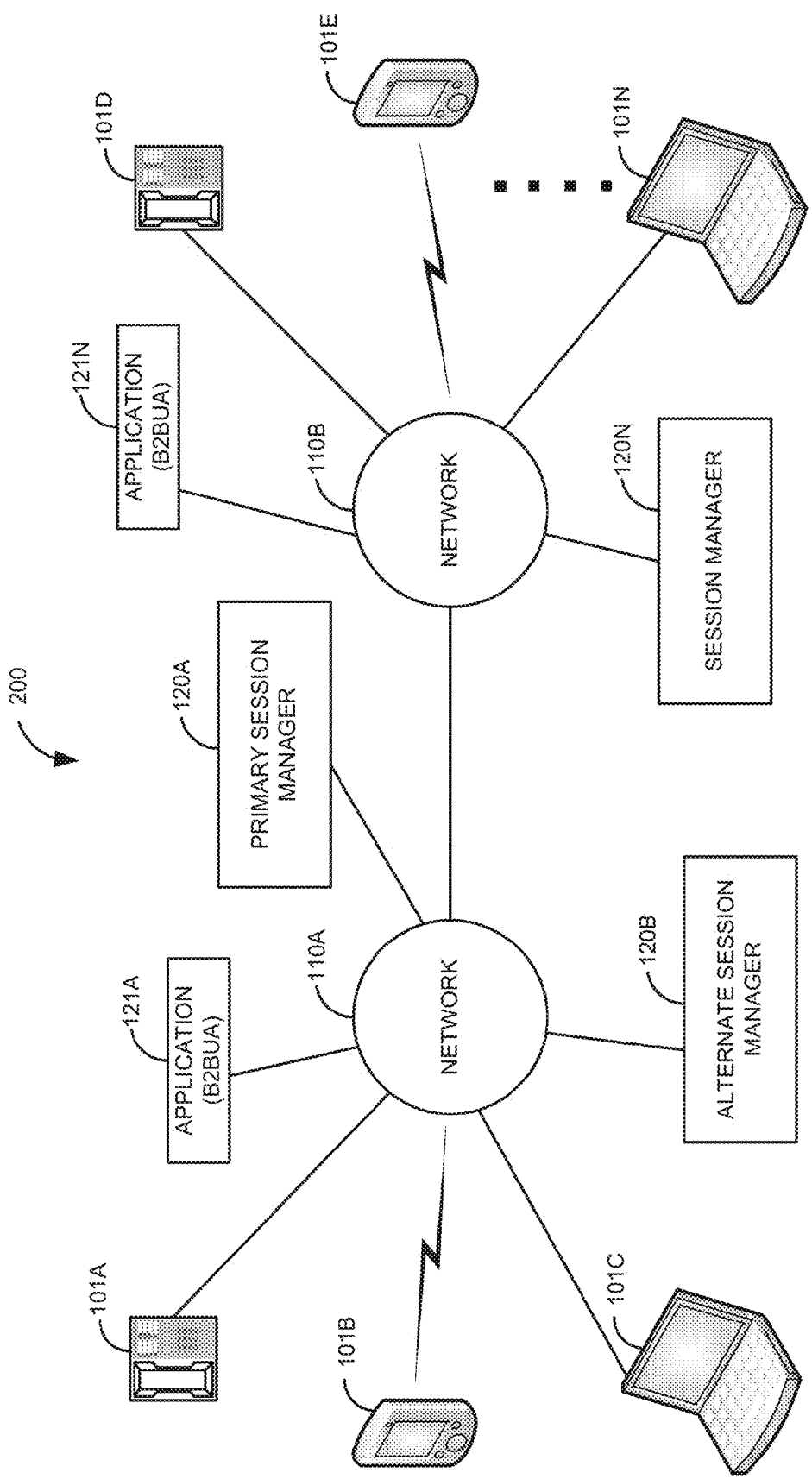
FIG. 2 is a block diagram of a second illustrative system for preserving multiple SIP dialogs in a communication session.

FIG. 2 is a block diagram of a second illustrative system 200 for preserving multiple SIP dialogs in a communication session. The second illustrative system 200 comprises the communication endpoints 101A-101N, networks 110A-110B, the primary session manager 120A, the alternate session manager 120B, a session manager 120N, and the applications 121A-121N.

The second illustrative system 200 is an exemplary embodiment of a distributed network comprising two separate networks 110A and 110B. For example, the network 110A may be a first location of an enterprise and the network 110B may be a second location of the enterprise. The two networks 110A and 110B may be separated by another network, such as the Internet.

The first network 110A comprises the communication endpoints 101A-101C, the primary session manger 120A, the alternate session manger 120B and the application 121A. Although not shown the first network 110A may comprise additional applications 121. Under normal working conditions, the application 121A is controlled by the primary session manager 120A. For example, the primary session manager 120A may insert the application 121A into a communication session/media stream based on a set of user preferences. If the primary session manager 120A fails, the alternate session manager 120B controls which application(s) 121 are inserted into the communication session/media stream based on the same preferences/configuration.

The second network 110B comprises the communication endpoints 101D-101N, the session manager 120N and the application 121N. In FIG. 2, the session manager 120N controls the application 121N. Although not shown, there may be additional applications 121 controlled by the session manager 120N. In addition, the second network 110B may also include an alternate session manager 120.

Figure 3:
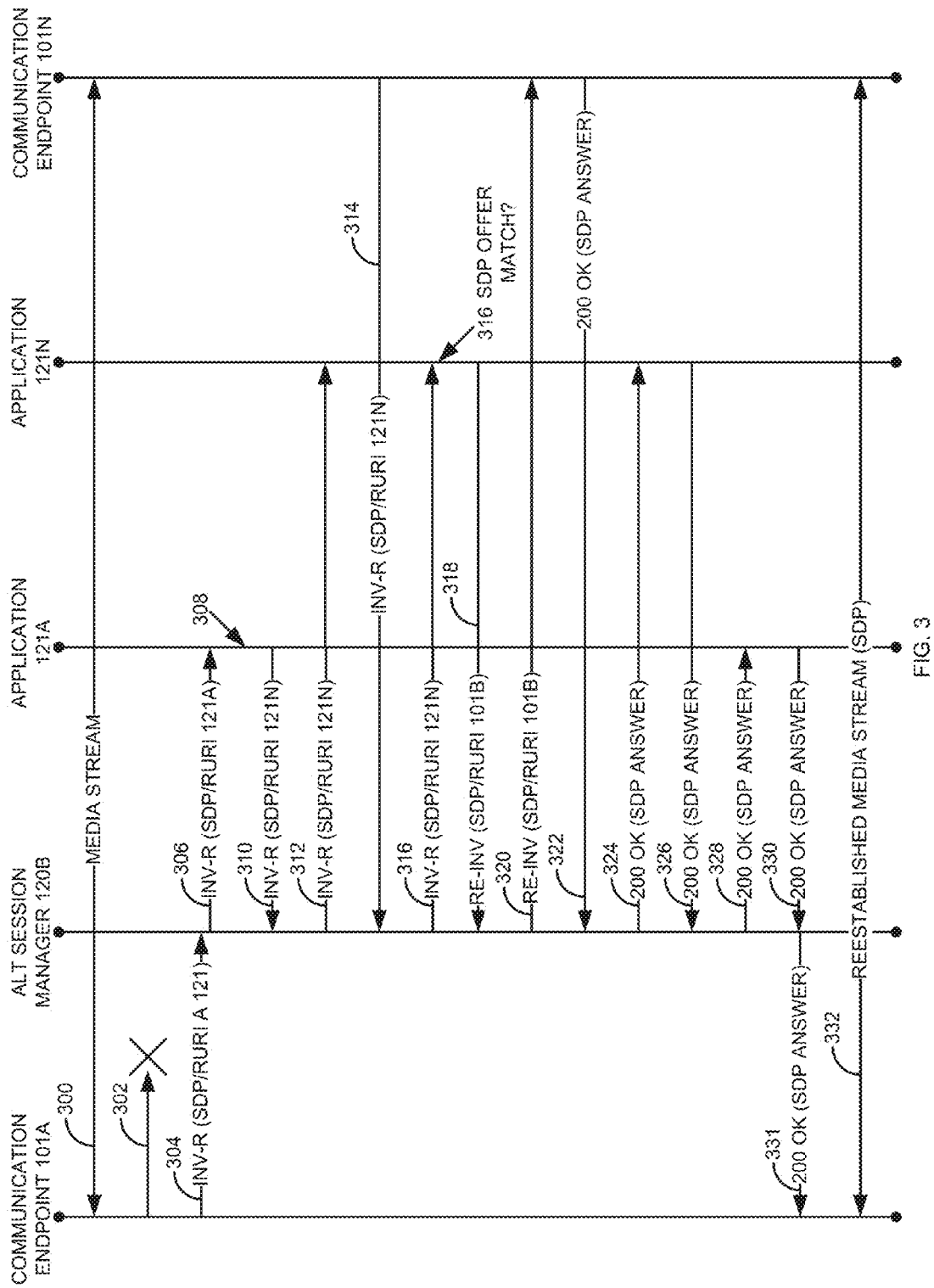
FIG. 3 is a flow diagram of a process for preserving multiple SIP dialogs in a communication session.
Figure 4:
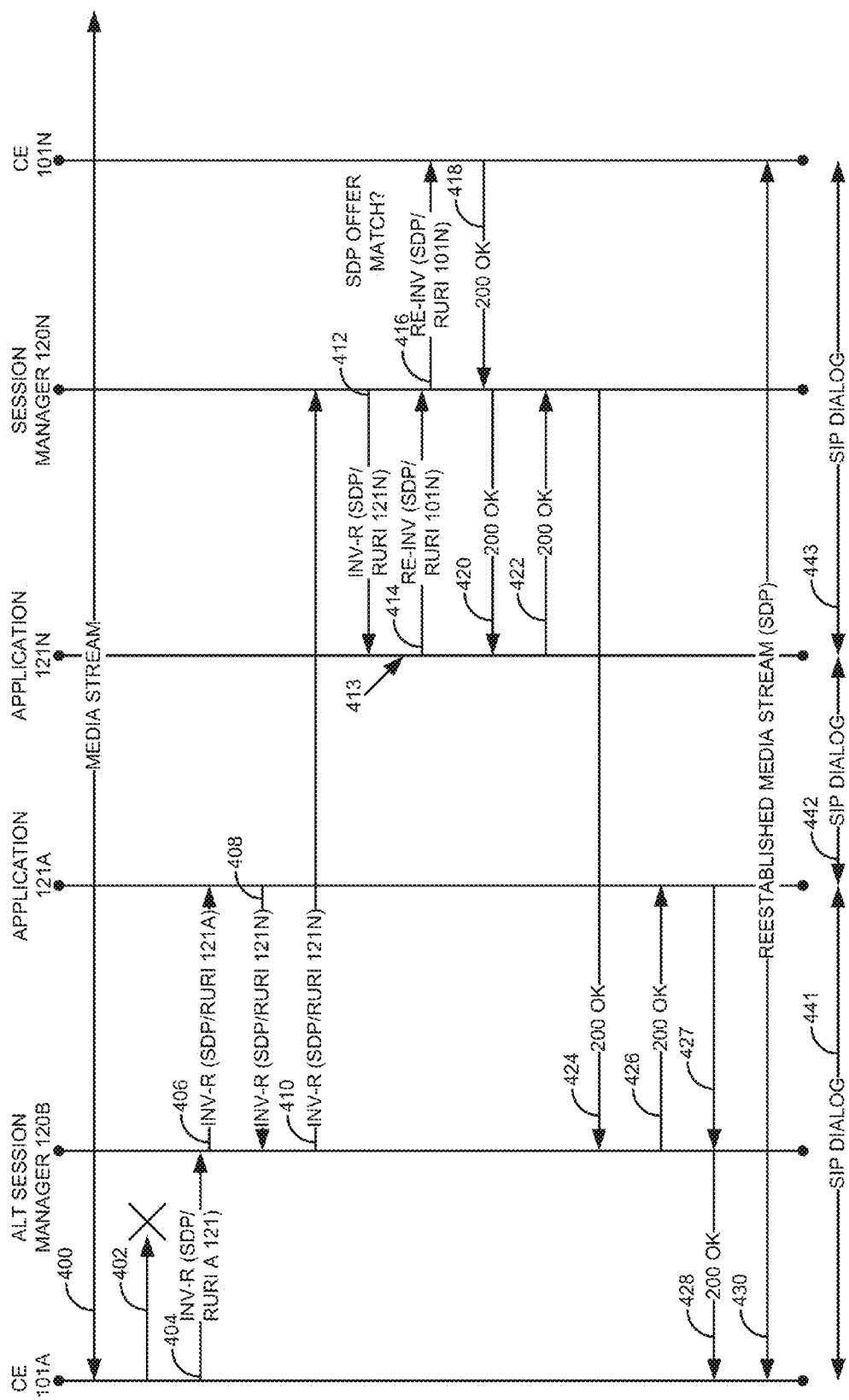
FIG. 4 is a flow diagram of a process for preserving multiple SIP dialogs in a communication session with multiple session managers.

FIG. 3 is a flow diagram of a process for preserving multiple SIP dialogs in a communication session. Illustratively, the communication endpoints 101A-101N, the networks 110A-110B, the session managers 120A-120N, and the applications 121A-121N are stored-program-controlled entities, such as a computer or processor, which performs the methods of FIGS. 3-4 and the processes described herein by executing program instructions stored in a computer readable storage medium, such as a memory or disk. Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300 where a media stream (e.g., a voice or video media stream using Session Description Protocol (SDP) and Real-Time Protocol (RTP)) has been established between the communication endpoint 101A and 101N. The communication session is a SIP communication session that has been established using standard SIP messaging (e.g., SIP INVITE/SIP 200 OK/SIP ACK) by the primary session manager 120A. The communication session has three SIP dialogs: 1) between the communication endpoint 101A and the application 121A, 2) between the application 121A and the application 121N, and 3) between the application 121N and the communication endpoint 101N.

In step 302, the primary session manager 120A fails or is unreachable. For example, the primary session manager 120A may not be reachable because the network 110 has failed. Alternatively, the primary session manager 120A may have had a hardware or software failure. When the primary session manager 120A fails, each of the three SIP dialogs fail will eventually fail. At this point, the communication endpoint 101A can no longer communicate with the primary session manger 120A. As a result, the communication endpoint 101A sends a SIP INVITE with replaces header message (normally used in SIP to transfer a call), to the alternate session manager 120B in step 304. The SIP INVITE with replaces header message of step 304 includes a Session Description Protocol (SDP) offer. If the IP address of the communication endpoint 101A has changed (e.g., if a WiFi network has also failed and the communication endpoint 101A is now using a new IP address on a second network 110) the SDP offer will be a new (different) SDP offer. If the IP address of the communication endpoint 101A has not changed, the SDP offer will typically be the same as for the media stream 300. The SIP INVITE with replaces header message of step 304 also includes a request Universal Resource Identifier (URI) that identifies the application 121A and a session ID for the previous SIP dialog between the communication endpoint 101A and the application 121A.

The alternate session manager 120B sends the SIP INVITE with replaces header message (with the SDP offer and request URI of the application 121A) to the application 121A in step 306. The SIP INVITE with replaces header message of step 306 includes information for routing the message of step 306 to the different applications 121A-121N (e.g., based on a system or user preference). The alternate session manager 120B can also add information to the SIP INVITE with replaces header message of step 306 so that the application 121A can take appropriate actions, such as sending the SIP INVITE with replaces header message of step 306 to the next application 121A or by responding by sending back a SIP 200 OK when the next dialog is a communication endpoint 101. The application 121A, determines, in step 308, based on the SIP INVITE with replaces header message of step 306, how to respond to the SIP INVITE with replaces header message of step 306. Based on the information in the SIP INVITE with replaces header message of step 306, the application 121A sends the SIP INVITE with replaces header message (with the SDP offer and a request URI of the application 121N) to the alternate session manager 120B in step 310.

The application 121A uses the session ID for the previous SIP dialog between the communication endpoint 101A and the application 121A to send the SIP INVITE with replaces header message in step 310. The application 121A knows that the previous SIP dialog between the communication endpoint 101A and the application 121A was associated with a previous SIP dialog between the application 121A and the application 121N. This association is used to send the SIP INVITE with replaces header message of step 310. The alternate session manager 120B sends the SIP INVITE with replaces header message to the application 121N in step 312.

In the mean time, the communication endpoint 101N may also send (may be at the same time or substantially the same time as step 304) a SIP INVITE with replaces header message in step 314 (similar to the SIP INVITE with replaces header message of step 304) to the alternate session manager 120B. The message of step 314 contains a Request URI (RURI) for the application 121N. The alternate session manager 120B sends the SIP INVITE with replaces header message to the application 121N in step 316. The simultaneous sending of SIP INVITE with replaces header messages (steps 304 and 314) can occur because both the communication endpoints 101A-101N will no longer be able to communicate with the primary session manager 120A.

The application 121N checks to see if the SDP offer matches the existing media stream (the media stream of step 300 and the flow of step 304-312) in step 316. If the SDP offer in the SIP INVITE with replaces header message of step 312/316 does not match the existing media stream (i.e., the one of the SDP offers is a new SDP offer) or only one offer was received that does not match the SDP for step 300 (where steps 314 and 316 did not occur), the application 121N sends a SIP Re-INVITE message with the new SDP offer and a request URI of the communication endpoint 101N to the alternate session manager 120B in step 318. The alternate session manager 120B sends the SIP Re-INVITE message (with the SDP offer/request URI of the communication endpoint 101N) to the communication endpoint 101N in step 320.

If the SDP offer matches the existing media stream in step 316, the application 121N does not send out the SIP Re-INVITE message in step 318. Instead, the application 121N responds by sending a 200 OK message (the message of step 326) with a previously saved SDP answer. In this case, steps 318, 320, and 322 do not occur because the SIP dialog between the application 121N and the communication endpoint 101N has not failed.

The communication endpoint 101N responds, in step 322, by sending a SIP 200 OK message with the SDP answer to the alternate session manager 120B. The alternate session manager 120B sends the SIP 200 OK message with the SDP answer to the application 121N in step 324. The application 121N sends the 200 OK message with the SDP answer to the alternate session manager 120B in step 326. The Alternate session manager 120B sends the 200 OK message with the SDP answer to the application 121A in step 328. The application 121A sends the 200 OK message with the SDP answer to the alternate session manager 120B in step 330. The alternate session manager 120B sends the 200 OK with the SDP answer to the communication endpoint 101A in step 331. In FIG. 2, although not shown for simplicity, the communication endpoint 101A will send a SIP ACK message that gets sent to the communication endpoint 101N (via the alternate session manager 120B/applications 121A-121N).

At this point, each of the three SIP dialogs (101A-121A, 121A-121N, and 121N-101N) have been reestablished. The communication endpoints 101A and 101N reestablish the media stream in step 332 using the SDP information in the SDP offer/SDP answer using Real-time Protocol (RTP).

In one embodiment, the applications 121A or 121N may start the process of FIG. 2. For example, the application 121A may determine that the SIP dialog between the application 121A and the application 121N has failed. The application 121A sends the SIP INVITE with replaces header of message of step 312. In this case, the SIP INVITE with replaces header message of step 312 occurs before the SIP INVITE with replaces header message of step 306.

FIG. 4 is a flow diagram of a process for preserving multiple SIP dialogs in a communication session with multiple session managers 120. The process of FIG. 4 is based on FIG. 2. The process starts in step 400 where a media stream (e.g., a voice or video media stream using Session Description Protocol (SDP) and Real-Time Protocol (RTP)) has been established between the communication endpoint 101A and 101N. The communication session is a SIP communication session that has been established using standard SIP messaging (e.g., SIP INVITE/SIP 200 OK/SIP ACK) by the primary session manager 120A and the session manager 120N. The communication session has three SIP dialogs: 1) between the communication endpoint 101A and the application 121A (441), 2) between the application 121A and the application 121N (442), and 3) between the application 121N and the communication endpoint 101N (443).

In step 402, the primary session manager 120A fails. When the primary session manager 120A fails, the SIP dialogs 441 and 442 will also fail. This is because the primary session manager 120A controls the flow of SIP messaging for the dialogs 441 and 442. However, the SIP dialog 443 will still be established because the session manager 120N controls the SIP dialog 443.

Because the SIP dialog 441 has failed, the communication endpoint 101A can no longer communicate with the primary session manger 120A. As a result, the communication endpoint 101A sends a SIP INVITE with replaces header message (normally used in SIP to transfer a call), to the alternate session manager 120B in step 404. The SIP INVITE with replaces header message of step 404 includes a Session Description Protocol (SDP) offer. If the IP address of the communication endpoint 101A has changed (e.g., if a WiFi network has also failed and the communication endpoint 101A is now using a new IP address on a second network 110B) the SDP offer will be a new SDP offer. If the IP address of the communication endpoint 101A has not changed, the SDP offer will typically be the same as for the media stream 400. The SIP INVITE with replaces header message of step 404 also includes a request Universal Resource Identifier (URI) that identifies the application 121A and a session ID for the previous SIP dialog between the communication endpoint 101A and the application 121A.

The alternate session manager 120B sends the SIP INVITE with replaces header message (with the SDP offer and request URI of the application 121A) to the application 121A in step 406. Although not shown, the process of FIG. 4 may also implement the steps described in steps 308-310 as described in FIG. 3 to verify that the dialog between the application 121A and the application 121N is still active. In response to receiving the SIP INVITE with replaces header message of step 406, the application 121A sends the SIP INVITE with replaces header message (with the SDP offer and a request URI of the application 121N) to the alternate session manager 120B in step 408.

The application 121A uses the session ID for the previous SIP dialog between the communication endpoint 101A and the application 121A to send the SIP INVITE with replaces header message of step 408. The application 121A knows that the SIP dialog 441 is associated with a previous SIP dialog between the application 121A and the application 121N. This association is used to send the SIP INVITE with replaces header message of step 408. The alternate session manager 120B sends the SIP INVITE with replaces header message of step 408 to the session manager 120N in step 410. The session manager 120N sends the SIP INVITE with replaces header message of step 410 to the application 121N in step 412.

The application 121N checks, in step 413, to see if the SDP offer matches the existing media stream (the media stream of step 400). If the SDP offer in the SIP INVITE with replaces header message of step 412 does not match the existing media stream (i.e., the SDP offer is a new SDP offer), the application 121N sends a SIP Re-INVITE message with the new SDP offer and a request URI of the communication endpoint 101N to the session manager 120N in step 414. The SIP Re-INVITE message of step 414 is used to send the new SDP to the communication endpoint 101N. The session manager 120N sends the SIP Re-INVITE message (with the new SDP offer/request URI of the communication endpoint 101N) to the communication endpoint 101N in step 416. In response to the Re-INVITE message of step 416, the communication endpoint 101N sends a SIP 200 OK message in step 418 to the session manager 120N with an SDP offer. The session manager 120N sends the 200 OK message with the SDP offer to the application 121N in step 420. The application 121N sends the SIP 200 OK message to the session manager 120N in step 422.

If the SDP offer matches, in step 413, the messages of steps 414-420 are not sent. Instead, the application 121N just responds to the SIP INVITE with replaces header message of step 412 with the 200 OK message of step 422 using a previously stored SDP offer of the communication endpoint 101A.

The session manager 120N sends the SIP 200 OK message with the SDP offer to the alternate session manager 120B in step 424. The alternate session manager 120B sends the 200 OK message with the SDP offer to the application 121A in step 426. The application 121A sends the 200 OK message with the SDP offer to the alternate session manager 120B in step 227. The alternate session manager 120B sends the 200 OK with the SDP offer in step 428.

At this point, SIP dialogs 441 and 442 have been reestablished. The communication endpoints 101A and 101N reestablish the media stream, in step 430, using the SDP information in the SDP offer/SDP answer.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to computer networks. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that cause the microprocessor to execute:
a first communication application that:
receives a first Session Initiation Protocol (SIP) INVITE with replaces header message sent by a first communication endpoint, wherein the first SIP INVITE with replaces header message is sent by the first communication endpoint based on a failure of a first SIP dialog with the first communication application, wherein the first SIP INVITE with replaces header message comprises a Session Description Protocol (SDP) offer and a first request Universal Resource Identifier (URI) that identifies the first communication application;
sends a second SIP INVITE with replaces header message, wherein the second SIP INVITE with replaces header message is sent to a second communication application;
in response to the second SIP INVITE with replaces header message being sent to the second communication application, receive a 200 OK with an SDP answer from the second communication application; and
sends the 200 OK with the SDP answer to the first communication endpoint.

2. The system of claim 1, wherein the microprocessor uses the first SIP INVITE with replaces header message to reestablish the first SIP dialog and the microprocessor uses the second SIP INVITE with replaces header message to reestablish a second SIP dialog between the first communication application and the second communication application, wherein the second communication application is not in a communication endpoint.

3. The system of claim 1, wherein the first SIP INVITE with replaces header message comprises a session identifier of a failed first SIP dialog and wherein the microprocessor sends the second SIP INVITE with replaces header message based on the session identifier of the failed first SIP dialog.

4. The system of claim 1, wherein the second SIP INVITE with replaces header message causes the second communication application to send a SIP Re-INVITE message to a second communication endpoint.

5. The system cairn 1, wherein the second SIP INVITE with replaces header message is sent to a third communication application and wherein the first, second, and third communication applications are not in a communication endpoint.

6. The system of claim 1, wherein the second communication application determines if the SDP offer matches an existing SDP offer or a received SDP offer.

7. The system of claim 1, wherein the second communication application is not in a communication endpoint, wherein the second SIP INVITE with replaces header message is used by the second communication application to reestablish a second SIP dialog between the first communication application and the second application.

8. The system of claim 7, wherein the second communication application uses the second SIP INVITE with replaces header message to send a SIP Re-INVITE message with a new SDP offer to the second communication endpoint.

9. The system of claim 6, wherein the second communication application determines that the SDP offer matches the existing SDP offer.

10. The system of claim 6, wherein the second communication application determines that the SDP offer matches the received SDP offer.

11. A method comprising:
receiving, by a microprocessor, a first Session Initiation Protocol (SIP) INVITE with replaces header message sent from a first communication endpoint, wherein the first SIP INVITE with replaces header message is sent by the first communication endpoint based on a failure of a first SIP dialog with a first communication application, wherein the first SIP INVITE with replaces header message comprises a Session Description Protocol (SDP) offer and a first request Universal Resource Identifier (URI) that identifies the first communication application;
in response to receiving the first SIP INVITE with replaces header message, sending, by the microprocessor, a second SIP INVITE with replaces header message, wherein the second SIP INVITE with replaces header message is sent to a second communication application;
receiving, by the microprocessor, 200 OK with an SDP answer from the second communication application in response to the second SIP INVITE with replaces header message being sent to the second communication application; and
sending, by the microprocessor, the 200 OK with the SDP answer to the first communication endpoint.

12. The method of claim 11, wherein the first SIP INVITE with replaces header message is used to reestablish the first SIP dialog and the second SIP INVITE with replaces header message is used to reestablish a second SIP dialog between the first communication application and the second communication application, wherein the second communication application is not in a communication endpoint.

13. The method of claim 11, wherein the first SIP INVITE with replaces header message comprises a session identifier of a failed first SIP dialog and wherein the second SIP INVITE with replaces header message is sent based on the session identifier of the failed first SIP dialog.

14. The method of claim 11, wherein the second SIP INVITE with replaces header message causes the second communication application to send a SIP Re-INVITE message to a second communication endpoint.

15. The method of claim 11, wherein the second SIP INVITE with replaces header message is sent to a third communication application and wherein the first, second, and third communication applications are not in a communication endpoint.

16. The method of claim 15, wherein the second communication application determines if the SDP offer matches an existing SDP offer or a received SDP offer.

17. The method of claim 16, wherein the second communication application determines that the SDP offer matches the existing SDP offer.

18. The method of claim 16, wherein the second communication application determines that the SDP offer matches the received SDP offer.

19. The method of claim 11, wherein the second communication application is not in a communication endpoint, wherein the second SIP INVITE with replaces header message is used by the second communication application to reestablish a second SIP dialog between the first communication application and the second communication application.

20. A non-transient computer readable medium having stored thereon instructions that cause a microprocessor to execute a method, the method comprising:
  instructions to receive a first Session Initiation Protocol (SIP) INVITE with replaces header message sent from a first communication endpoint, wherein the first SIP INVITE with replaces header message is sent by the first communication endpoint based on a failure of a first SIP dialog with a first communication application, wherein the first SIP INVITE with replaces header message comprises a Session Description Protocol (SDP) offer and a first request Universal Resource Identifier (URI) that identifies the first communication application;
  instructions to send a second SIP INVITE with replaces header message in response to receiving the first SIP INVITE with replaces header message, wherein the second SIP INVITE with replaces header message is sent to a second communication application;
  instructions to receive a 200 OK with an SDP answer from the second communication application in response to the second SIP INVITE with replaces header message being sent to the second communication application; and
  instructions to send the 200 OK with the SDP answer to the first communication endpoint.

* * * * *

UNITED STATES PATENT AND TRADEMARK OFFICE
CERTIFICATE OF CORRECTION

PATENT NO.         : 10,469,538 B2                                              Page 1 of 1
APPLICATION NO.    : 15/087769
DATED              : November 5, 2019
INVENTOR(S)        : Harsh V. Mendiratta, Tibor Lukac and Stephen Andrew Baker It is certified that error appears in the above-identified patent and that said Letters Patent is hereby corrected as shown below:

In the Claims

At Column 12, Line 10, please delete "cairn" and insert --of claim-- therein.

At Column 12, Line 52, after "by the microprocessor," insert --a-- therein.

Signed and Sealed this
Thirty-first Day of December, 2019

Andrei Iancu
*Director of the United States Patent and Trademark Office*